(12) United States Patent
Nishimura et al.

(10) Patent No.: US 11,362,497 B2
(45) Date of Patent: Jun. 14, 2022

(54) SUPPORT MEMBER—ATTACHED WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Ryuta Takakura, Mie (JP); Syo Shiratori, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/253,954

(22) PCT Filed: Oct. 23, 2018

(86) PCT No.: PCT/JP2018/039259
§ 371 (c)(1),
(2) Date: Dec. 18, 2020

(87) PCT Pub. No.: WO2019/244367
PCT Pub. Date: Dec. 26, 2019

(65) Prior Publication Data
US 2021/0273432 A1    Sep. 2, 2021

(30) Foreign Application Priority Data
Jun. 22, 2018 (JP) .............................. JP2018-118524

(51) Int. Cl.
*H02G 3/04* (2006.01)
*B60R 16/02* (2006.01)
(Continued)

(52) U.S. Cl.
CPC ....... *H02G 3/0462* (2013.01); *B60R 16/0207* (2013.01); *F16B 7/042* (2013.01);
(Continued)

(58) Field of Classification Search
CPC .. B60R 16/02; B60R 16/0207; B60R 16/0215
See application file for complete search history.

(56) References Cited

U.S. PATENT DOCUMENTS

| 2007/0066101 A1 | 3/2007 | Suzuki |
| 2007/0102184 A1 | 5/2007 | Lord et al. |

(Continued)

FOREIGN PATENT DOCUMENTS

| CN | 101005201 | 7/2007 |
| CN | 102918731 | 2/2013 |

(Continued)

OTHER PUBLICATIONS

International Search Report (ISR) issued in International Patent Application No. PCT/JP2018/039259, dated Jan. 8, 2019, together with English translation thereof.

(Continued)

*Primary Examiner* — Paresh H Paghadal
(74) *Attorney, Agent, or Firm* — Greenblum & Bernstein, P.L.C.

(57) ABSTRACT

A support member-attached wiring member includes: a wiring member flatly formed; a support member including a fitting part formed into a cylindrical shape opening in one portion in a circumferential direction so as to be able to be fitted to an outer peripheral part of a rod-like member; a penetration part passing through the wiring member in a state where the wiring member is disposed on an outer side of the support member; and a retaining part which does not pass through the wiring member but is provided on an outer (Continued)

side of the wiring member to prevent the penetration part from coming out of the wiring member.

7 Claims, 7 Drawing Sheets

(51) Int. Cl.
*F16B 7/04* (2006.01)
*H02G 3/06* (2006.01)
*H02G 3/32* (2006.01)

(52) U.S. Cl.
CPC ................ *H02G 3/06* (2013.01); *H02G 3/32* (2013.01); *B60R 16/0215* (2013.01)

(56) References Cited

U.S. PATENT DOCUMENTS

| | | | |
|---|---|---|---|
| 2012/0132465 A1* | 5/2012 | Mabuchi | B60R 16/0215 174/72 A |
| 2014/0042280 A1 | 2/2014 | Takeuchi et al. | |
| 2014/0196929 A1 | 7/2014 | Okuhara | |
| 2017/0313266 A1* | 11/2017 | Mizuno | B60R 16/0215 |

FOREIGN PATENT DOCUMENTS

| | | |
|---|---|---|
| CN | 103782460 | 5/2014 |
| JP | 2003-274540 | 9/2003 |
| JP | 2005-112283 | 4/2005 |
| JP | 2006-320114 | 11/2006 |
| JP | 2006-325378 | 11/2006 |
| JP | 2007-28842 | 2/2007 |
| JP | 2008-125253 | 5/2008 |
| JP | 2014-011837 | 1/2014 |

OTHER PUBLICATIONS

International Preliminary Report on Patentability (IPRP) issued in International Patent Application No. PCT/JP2018/039259, dated May 14, 2019, together with English translation thereof.
China Office Action issued in China Patent Application No. 201880094823.1, dated Sep. 18, 2021, together with English translation thereof.

* cited by examiner

SUPPORT MEMBER—ATTACHED WIRING MEMBER

TECHNICAL FIELD

The present invention relates to a technique of making a rod-like member support a wiring member.

BACKGROUND ART

Patent Document 1 discloses a technique of making a rod-like member support a wiring member. A wire harness support member described in Patent Document 1 includes a fitting part which the rod-like member can be held in and fitted to and a protection part provided to be integral with the fitting part on an outer periphery of the fitting part to cover a wire harness as the wiring member.

PRIOR ART DOCUMENTS

Patent Documents

Patent Document 1: Japanese Patent Application Laid-Open No. 2014-11837

SUMMARY

Problem to be Solved by the Invention

However, the wire harness support member described in Patent Document 1 is suitable for supporting a wire harness having a round shape in cross section such as a wire bundle, but is not suitable for supporting a flat wiring member.

Therefore, it is an object of the present invention to provide a technique suitable for making a rod-like member support a flat wiring member.

Means to Solve the Problem

In order to solve the above problems, a support member-attached wiring member according to a first aspect includes: a wiring member flatly formed; a support member including a fitting part formed into a cylindrical shape opening in one portion in a circumferential direction so as to be able to be fitted to an outer peripheral part of a rod-like member; a penetration part passing through the wiring member in a state where the wiring member is disposed on an outer side of the support member; and a retaining part which does not pass through the wiring member but is provided on an outer side of the wiring member to prevent the penetration part from coming out of the wiring member, wherein the wiring member is bended along a circumferential direction of the fitting part, and the retaining part covers only an end portion of the wiring member in a circumferential direction bended along the circumferential direction of the fitting part.

A support member-attached wiring member according to a second aspect is the support member-attached wiring member according to the first aspect, wherein the penetration part is molded integrally with the support member.

A support member-attached wiring member according to a third aspect is the support member-attached wiring member according to the first or second aspect, wherein tbc retaining part is molded integrally with the support member so as to be rotatable via a hinge.

A support member-attached wiring member according to a fourth aspect is the support member-attached wiring member according to any one of the first to third aspects, wherein the support member further includes a locking part locked to a locked part of the retaining part.

A support member-attached wiring member according to a fifth aspect is the support member-attached wiring member according to the fourth aspect, wherein the locking part is provided separately from the penetration part.

A support member-attached wiring member according to a sixth aspect is the support member-attached wiring member according to any one of the first to fifth aspects, wherein the wiring member includes a plurality of wire-like transmission members and a sheet material keeping the plurality of wire-like transmission members in a flat state and allowing the penetration part to pass through the sheet material.

A support member-attached wiring member according to a seventh aspect is the support member-attached wiring member according to any one of tins first to sixth aspects, wherein the wiring member is sandwiched and held between the support member and the retaining part.

Effects of the Invention

According to each aspect, the retaining part prevents the penetration part from coming out of the wiring member, thus the wiring member is supported by the support member. At this time, the penetration part passes through the wiring member, thus the wiring member can be positioned in the support member. The support member supporting the wiring member is supported by the rod-like member, thus the rod-like member can support the flat wiring member.

According to the second aspect, the penetration part hardly comes out to the outer peripheral side of the wiring member compared with the case where the penetration part is formed separately from the support member.

According to the third aspect, the number of components can be reduced compared with the case where the retaining part is formed separately from the support member.

According to the fourth aspect, the retaining part can be locked.

According to the fifth aspect, a stable locking state can be easily obtained.

According to the sixth aspect, the flat wiring member can be formed using a generalized electrical wire.

According to the seventh aspect, the wiring member is hard to get loose state.

DESCRIPTION OF EMBODIMENT(S)

Embodiment

Figure 1:
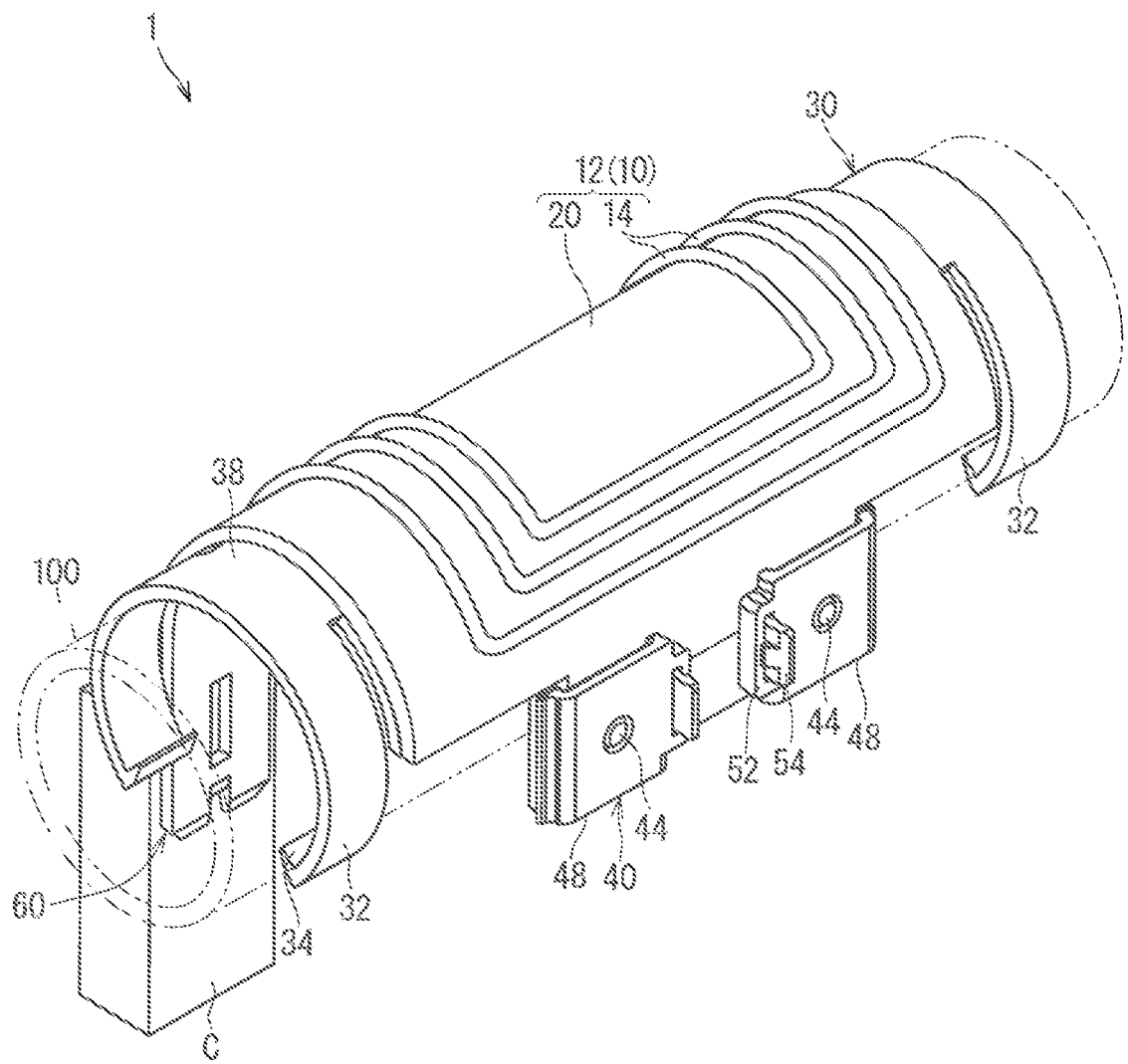
FIG. 1 is a perspective view illustrating a support member-attached wiring member according to an embodiment.

A support member-attached wiring member according to an embodiment is described hereinafter. FIG. 1 is a perspective view illustrating a support member-attached wiring member 1 according to the embodiment.

The support member-attached wiring member 1 is assembled to a rod-like member 100 provided in a vehicle. The rod-like member 100 is described firstly.

In the description herein, the rod-like member 100 is a reinforcement. Particularly in the description herein, the rod-like member 100 is an instrument panel reinforcement provided on a rear side of an instrument panel. The rod-like member 100 may be a member with a rod-like shape provided in a vehicle, and, for example, a member such as a pillar other than the reinforcement may also be applicable. In the example illustrated in FIG. 1, the rod-like member 100 is formed into a cylindrical shape, however, this configuration is not necessary. The rod-like member 100 may have a rectangular cylindrical shape, a columnar shape, or a rectangular columnar shape, for example.

The support member-attached wiring member 1 includes a wiring member 10 and a support member 30. The wiring member 10 is supported by the support member 30. The support member 30 can be attached to the rod-like member 100. Accordingly, the support member 30 of the support member-attached wiring member 1 is attached to the rod-like member 100, thus the wiring member 10 can be simply assembled to the rod-like member 100.

Figure 2:
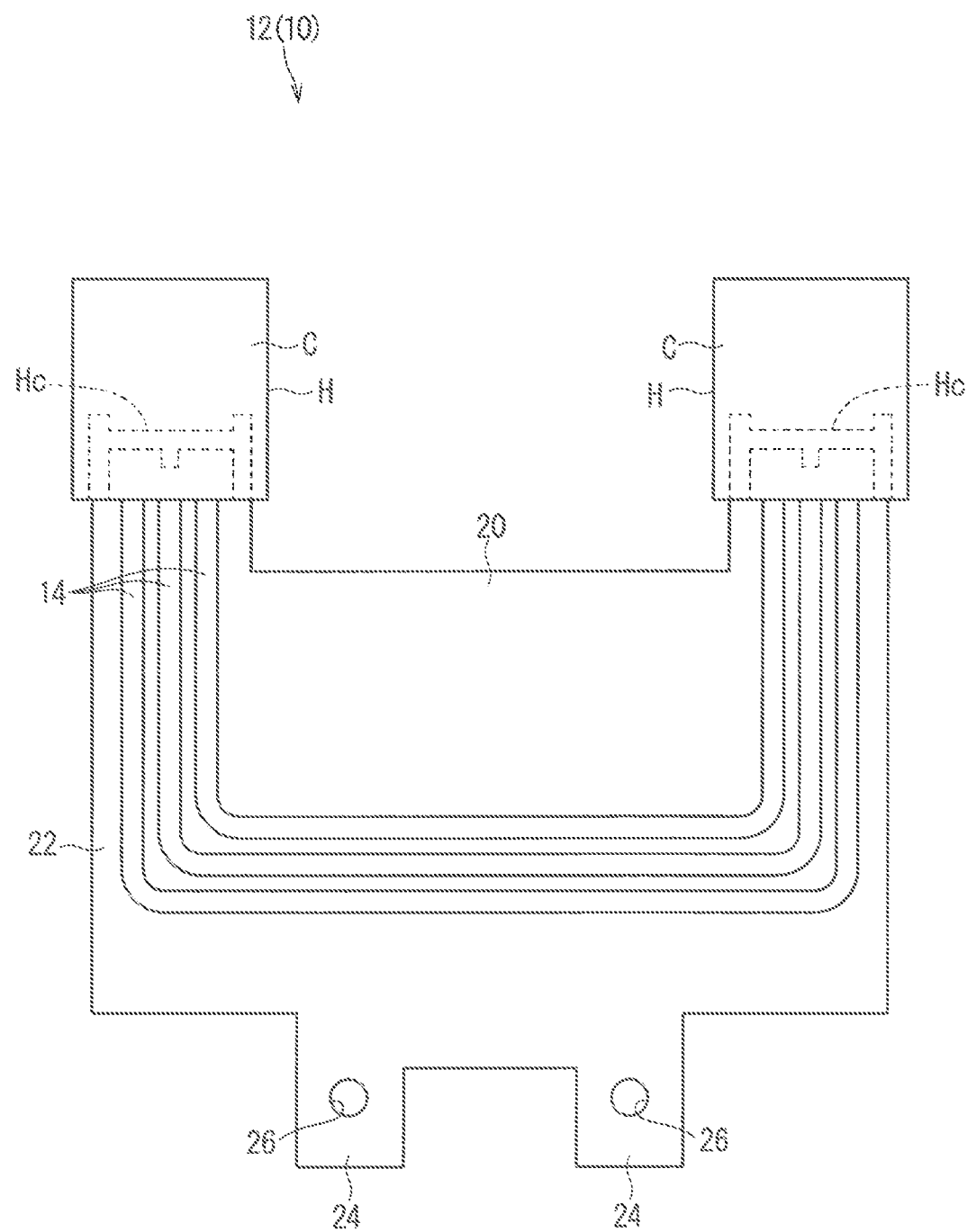
FIG. 2 is a plan view illustrating a wiring member.

The wiring member 10 is described with reference to FIG. 2 in addition to FIG. 1. FIG. 2 is a plan view illustrating the wiring member 10.

The wiring member 10 is a wiring member for a vehicle joined to a component mounted to the vehicle to transmit electrical power or light to and/or from the component. Accordingly, the wiring member 10 includes a transmission member transmitting electrical power or light. The wiring member 10 is flatly formed. In the description hereinafter, the wiring member 10 is a sheet material-attached wire body 12. The sheet material-attached wire body 12 includes a plurality of wire-like transmission members 14 and a sheet material 20.

It is sufficient that the wire-like transmission member 14 is a wire-like member transmitting electrical power or light. For example, the wire-like transmission member 14 may be a general wire having a core wire and a covering around the core wire, or may also be a bare conductive wire, a shielded wire, an enamel wire, a nichrome wire, or an optical fiber. The wire-like transmission member 14 transmitting the electrical power may be various kinds of signal lines or various kinds of power lines.

Herein, the wire-like transmission member 14 includes a transmission wire body transmitting electrical power or light and an outer coat covering the transmission wire body. In the description hereinafter, the wire-like transmission member 14 is a general wire 14 (simply referred to as the electrical wire 14 hereinafter). That is to say, the electrical wire 14 includes a core wire as the transmission wire body and an insulating covering as the outer coat covering the transmission wire body.

The core wire is made up of one or a plurality of strands. The strand is formed of a conductor made of copper, copper alloy, aluminum, or aluminum alloy, for example. When the core wire is made up of the plurality of strands, the plurality of strands are preferably stranded. The insulating covering is formed of a resin material such as polyvinyl chloride (PVC) or polyethylene (PE) extrusion-molded around the core wire. Herein, the electrical wire 14 is a so-called round wire having a round shape in cross section.

Herein, a connector C is provided on an end portion of the electrical wire 14. The connector C is connected to a partner connector provided in an electrical component, for example. Herein, the connector C is connected to one side portion of the wiring member 10. The connector C is formed by housing the end portion of the electrical wire 14 in an electrical wire housing part of a housing H. The housing H may be or may not be directly fixed to the sheet material 20. A cassette part Hc is provided in the housing H. A catching part (a second catching part 60) provided in the support member 30 is inserted into the cassette part Hc and attached thereto, thus the one side portion of the wiring member 10 is fixed to the support member 30.

Herein, the plurality of (two in an example illustrated in FIG. 2) connectors C are provided on one side portion of the wiring member 10. The plurality of connectors C are provided at intervals in a longitudinal direction of the rod-like member 100. The plurality of connectors C are provided to be connectable in the same direction, but may be connected in different directions.

The sheet material 20 keeps the plurality of electrical wires 14 in a flat state. Herein, the electrical wire 14 is disposed an the sheet material 20. A penetration part 44 described hereinafter passes through the sheet material 20. At this time, an insertion hole 26 through which the penetration part 44 passes is formed in the sheet material 20 in advance. The sheet material 20 is partially sandwiched and held by the support member 30. The sheet material 20 includes an arrangement body part 22 where the electrical wire 14 is disposed and a fixing piece 24 sandwiched and held by the sheet material 20. The insertion hole 26 is formed in the fixing piece 24.

The electrical wire 14 and the sheet material 20 are fixed by a fixing means. Welding is adopted herein as a means of fixing the electrical wire 14 and the sheet material 20. That is to say, at least one of the electrical wire 14 and the sheet material 20 has a resin material, and the resin material is melt to be joined to the other element.

The welding means is not particularly limited, however, adoptable are various welding means such as ultrasonic welding, heating and pressurizing welding, hot-air welding, and high-frequency welding.

It is sufficient that the sheet material 20 is fixed to the electrical wire 14, thus a material constituting the sheet material 20 is not particularly limited. The material constituting the sheet material 20 may include resin such as PVC, PE, polyethylene terephthalate (PET), or polypropylene (PP), for example, or may include metal such as aluminum or copper.

It is sufficient that the material constituting the sheet material 20 is set in accordance with a fixing means. For example, when the sheet material 20 and an insulating covering of the electrical wire 14 are welded, the arrangement body part 22 of the sheet material 20 preferably contains resin, and it is more preferable that the arrangement body part 22 of the sited material 20 and the insulating covering of the electrical wire 14 contain the same resin. Accordingly, both the insulating covering or the electrical wire 14 and the resin sheet material 20 are melted and mutually joined, thus welding intensity can be increased.

The sheet material 20 may be made of a material having fiber such as a woven cloth, a knitted cloth, or a non-woven cloth, for example, or may not have fiber but be bonded and formed by extrusion molding or injection molding. In the latter case, the sheet material 20 may be a foam formed by foam molding, or may be molded to have a uniform cross section instead of the foam molding.

The sheet material 20 may have a single layer structure or a multilayer structure. In the latter case, the sheet material 20 is considered to have a first layer suitable for fixing (welding herein) the electrical wire 14 and a second layer suitable for the other function such as a protection function, a sound insulating function, or a shielding function. In the latter case, layers with fiber or layers with no fiber may be overlapped with each other, or a layer with fiber and a layer with no fiber may be overlapped with each other.

When the sheet material 20 has the multilayer structure, the sheet material 20 may be molded by bonding base members which have been separately molded, or may be molded by single extrusion molding or injection molding.

The plurality of electrical wires 14 are parallelly disposed on the sheet material 20. A route of the electrical wire 14 on the sheet material 20 may be linearly disposed, or bended and disposed, thus may be appropriately set. In the example illustrated in FIG. 2, the electrical wires 14 has a portion linearly disposed and a portion bended and disposed as a route. Herein, each electrical wire 14 is disposed on the sheet material 20 to connect the two connectors C separately disposed on one side portion of the wiring member 10.

A fixing piece 24 is provided on a side part of the sheet material 20 on a side opposite to a side of the connector C. In the example illustrated in FIG. 2, the two fixing pieces 24 protrude from a middle portion of a side edge of the arrangement body part 22. Each fixing piece 24 is formed into a rectangular shape. However, a position and the shape of the fixing piece 24 are not limited thereto. It is sufficient that the fixing piece 24 is formed in accordance with a position and a shape of a catching part (a first catching part) of the support member 30 sandwiching and holding the fixing piece 24.

The wiring member 10 has flexibility. Due to the flexibility, the wiring member 10 is bended and disposed to follow a bended part of the support member 30.

More specifically, herein, the support member 30 is a member fitted to the rod-like member 100 such as a reinforcement and has a part bended along a circumferential direction in an outer surface thereof. The wiring member 10 has flexibility in a direction of being disposed along the circumferential direction of the support member 30. More specifically, the sheet material 20 has flexibility herein. At this time, even when the electrical wire 14 is disposed on the sheet material 20, the electrical wire 14 does not interfere with the flexibility of the sheet material 20. Accordingly, the sheet material-attached wire body 12 has the flexibility, and can also be bended and disposed along the circumferential direction of the support member 30 having the portion bended in the circumferential direction.

Figure 3:
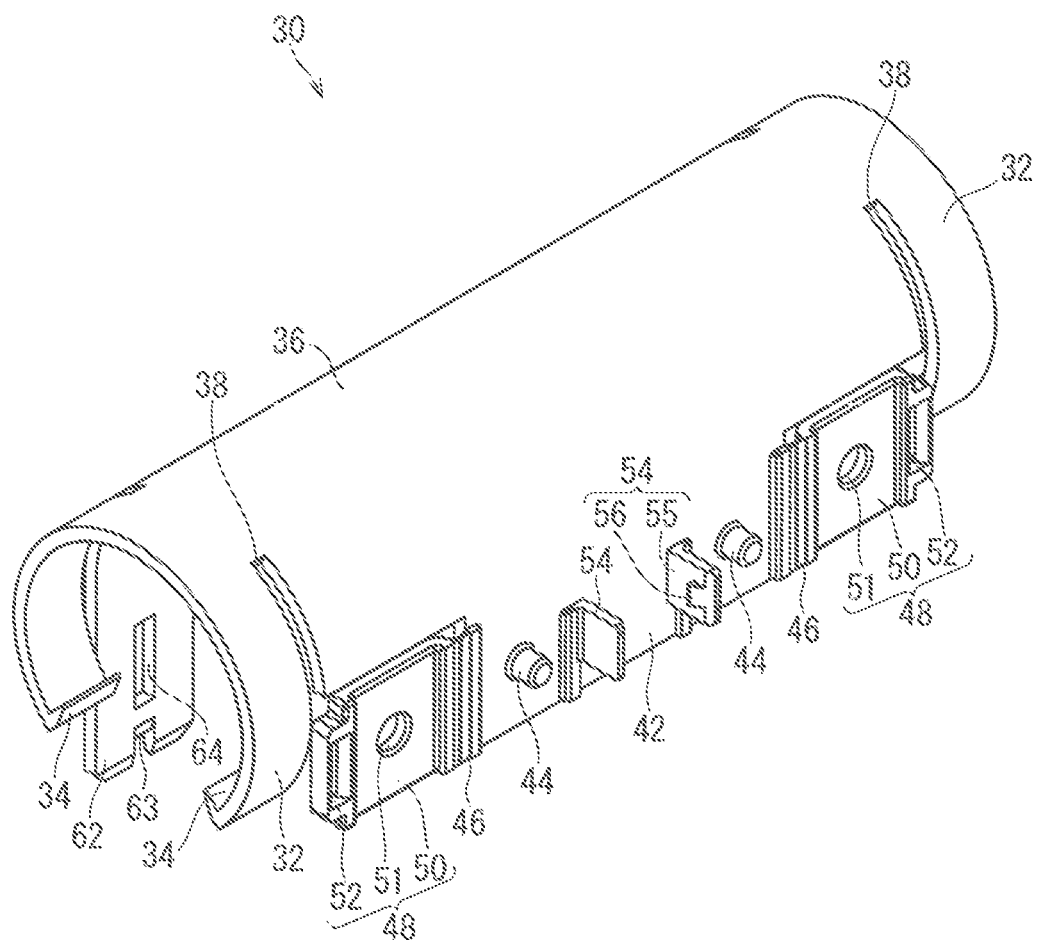
FIG. 3 is a perspective view illustrating a support member.
Figure 4:
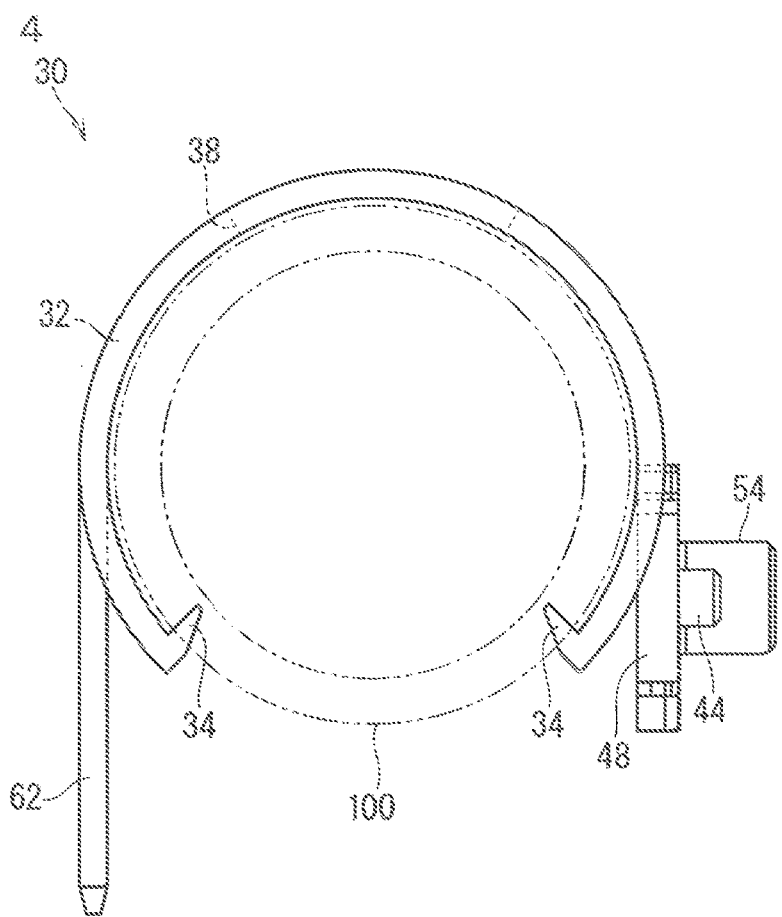
FIG. 4 is a front view illustrating a support member.
Figure 5:
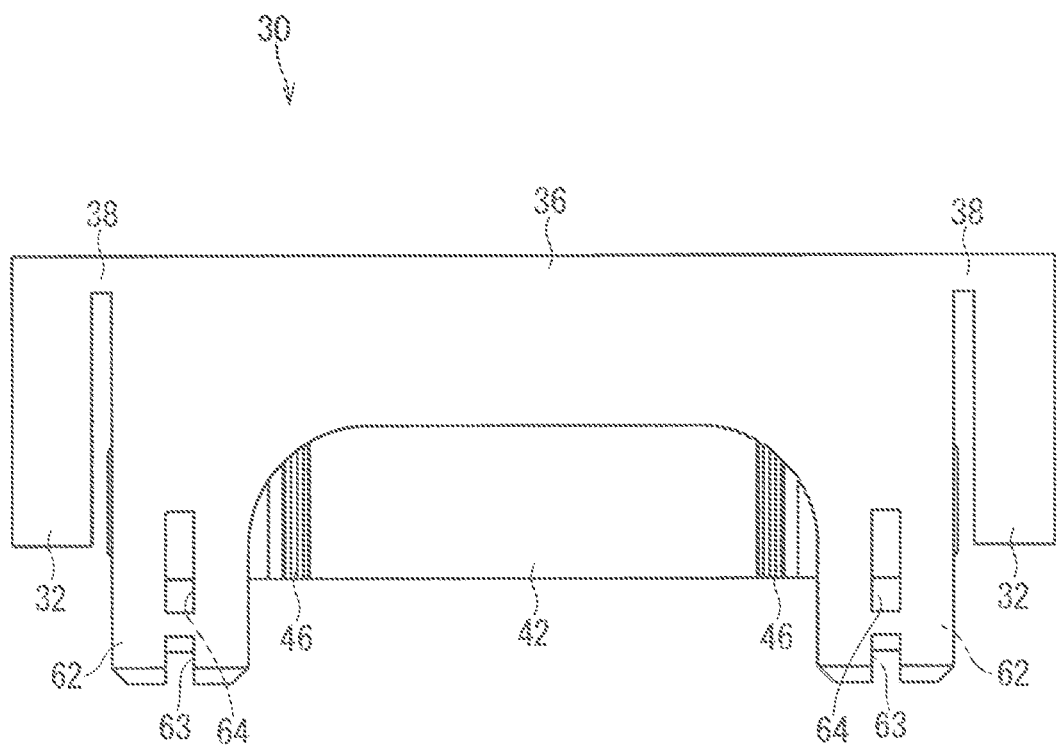
FIG. 5 is a side view illustrating a support member.

The support member 30 is described with reference to FIG. 3 to FIG. 5 in addition to FIG. 1 to FIG. 1. FIG. 3 is a perspective view illustrating the support member 30. FIG. 4 is a front view illustrating the support member 30. FIG. 5 is a side view illustrating the support member 30.

The support member 30 includes a fitting part 32, a mounting body part 36, and a connection part 38. Herein, the support member 30 further includes a catching part.

The fitting part 32 is formed into a cylindrical shape opening in one portion in a circumferential direction so as to be able to be fitted to an outer peripheral part of the rod-like member 100. For example, the fitting part 32 is formed into a partially-cylindrical shape with an angle larger than 180 degrees with respect to the rod-like member 100 having a circular shape. Herein, the fitting part 32 is formed into a partially-cylindrical shape with an angle of 240 degrees. When the support member 30 is attached to the rod-like member 100, the rod-like member 100 is inserted into the fitting part 32 through an opening, of the fitting part 32. At this time, the fitting part 32 can be elastically deformed so that the opening spreads, thus the rod-like member 100 is housed inside the fitting part 32.

Formed in an end portion of the fitting part 32 in the circumferential direction is a protrusion 34 fitted to a concave part (illustration omitted) formed on an outer peripheral surface of the rod-like member 100. The protrusion 34 is fitted to the concave part in a state where the rod-like member 100 is housed in the fitting part 32, thus a displacement of the support member 30 in a longitudinal direction and the circumferential direction with respect to the rod-like member 100 can be suppressed.

Herein, the plurality of (two in the example illustrated in FIG. 1) fitting parts 32 are provided at intervals in the longitudinal direction of the rod-like member 100. The mounting body part 36 is provided between the plurality of fitting parts 32.

The mounting body part 36 is formed to cover a region smaller than the fitting part 32 around the rod-like member 100. For example, the mounting body part 36 is formed into a partially-cylindrical shape with an angle equal to or smaller than 180 degrees with respect to the rod-like member 100 having a circular shape. Herein, the mounting, body part 36 is formed into a partially-cylindrical shape with an angle of 180 degrees.

The fitting part 32 and the mounting body part 36 are connected to each other via the connection part 38. The connection part 38 covers a region smaller than the fitting part 32. The connection part 38 covers a region smaller than the mounting body part 36. Accordingly, when the fitting part 32 is elastically deformed so that the opening thereof spreads at the time of attaching the support member 30 to the rod-like member 100, the mounting body part 36 hardly interferes with the elastic deformation of the fitting part 32. In the example illustrated in FIG. 3, the connection part 38 covers 60 degrees of the rod-like member 100 having the circular shape.

Herein, a center of the opening of the fitting part 32 and a center of the opening of the mounting body part 36 coincide with each other. The connection part 38 connects the fitting part 32 and the mounting body part 36 on a side opposite to the center of the opening. Needless to say, there may also be a case where the fitting part 32 and the mounting body part 36 are connected to each other in the other position. For example, it is also considered that the connection part 38 connects the fitting part 32 and the mounting body part 36 in a part closer to one end portion of the fitting part 32, for example.

The support member-attached wiring member 1 includes the penetration part 44 and a retaining part 48. The penetration part 44 and the retaining part 48 are parts positioning and attaching the wiring member 10 to the support member 30. The penetration part 44 is a part passing through the wiring member 10 in a state where the wiring member 10 is disposed on an outer side of the support member 30 (outside the mounting body part 36 herein). The retaining part 48 does not pass through the wiring member 10 but is provided outside the wiring member 10. The retaining part 48 is a part preventing the penetration part 44 from coming out of the wiring member 10. Herein, the penetration part 44 and the retaining part 48 are provided in the support member 30. That is to say, the penetration part 44 and the retaining part 48 are molded integrally with the support member 30. The penetration part 44 and the retaining part 48 constitute a part of the catching part.

The catching part is a part attaching the wiring member 10. Herein, the first catching part 40 and the second catching part 60 are provided as the catching part. The penetration part 44 and the retaining part 48 are provided in the first catching part 40.

The first catching part 40 attaches the sheet material 20 of the wiring member 10. Herein, the plurality of first catching parts 40 are provided. The plurality of first catching parts 40 are provided at intervals along the longitudinal direction of the support member 30. The first catching part 40 includes an extension piece 42, the penetration part 44, a hinge 46, the retaining part 48, and a locking part 54.

The extension piece 42 extends from an end portion of the mounting body part 36 in the circumferential direction. Herein, the extension piece 42 extends from the end portion of a middle portion of the mounting body part 36 in the circumferential direction. The extension piece 42 extends in a tangential direction from an end portion of the mounting body part 36 in the circumferential direction.

The penetration part 44 is provided to protrude outward from an outer surface of the extension piece 42. A shape of the penetration part 44 is not particularly limited. For example, the penetration part 44 is formed into a columnar shape or a cone-like shape. A lateral cross section of the penetration part 44 is formed into a circular shape or a quadrangular shape, for example. Herein, the penetration part 44 is formed into a circular column-like shape. A protrusion dimension of the penetration part 44 is not particularly limited, however, it is sufficient that a portion of a tip end side of the penetration part 44 is set to be able to be housed in a through hole 51 formed in the retaining part 48. It is further sufficient that the portion of the tip end side of the penetration part 44 is set not to protrude outside the through hole 51 formed in the retaining part 48.

The hinge 46 is a part rotatably connecting the extension piece 42 and the retainer part 48. Herein, the hinge 46 is provided on an end edge portion of the extension piece 42 in the longitudinal direction of the rod-like member 100. Accordingly, the retaining part 48 is rotatable around an axis along an extension direction of the extension piece 42 from the mounting body part 36 (a tangential direction of an end portion of the mounting body part 36). A position of the hinge 46 is not obviously limited to that described above. For example, the hinge 46 may be provided on a tip end edge portion of the extension piece 42 (an edge portion of an end portion on a side opposite to an end portion connected to the mounting body part 36).

The retaining part 48 is molded integrally with the support member 30 so as to be rotatable with respect to the extension piece 42 via the hinge 46. The retaining part 48 rotates with respect to the extension piece 42, thereby being able to be opened and closed. The retaining part 48 is located on an end portion side of the mounting body part 36 where the extension piece 42 is not provided in an open state as illustrated in FIG. 3. The retaining part 48 overlaps with an outer side of the extension piece 42 in a close state as illustrated in FIG. 1. The retaining part 48 includes a retaining piece 50 and a locked part 52.

The retaining piece 50 is a part connected to the extension piece 42 via the hinge 46. The retaining piece 50 faces the extension piece 42 in the close state. The retaining piece 50 is formed into a rectangular shape, for example. One side of the rectangular retaining piece 50 is connected to the hinge 46, and the locked part 52 is provided on the other side opposite to the one side. The through hole 51 is formed on a middle portion of the rectangular retaining part 48. The through hole 51 is a concave part in which a protrusion part of the penetration part 44 protruding outside the wiring member 10 is housed. However, not the through hole 51 but a bottomed hole may be formed as the concave part in which the penetration part 44 is housed.

The locked part 52 is formed to be able to be locked to the locking part 54. The locked part 52 is described together with the locking part 54.

The locking part 54 can be locked to the locked part 52. Herein, the locking part 54 is provided separately from the penetration part 44. Particularly herein, the locking part 54 is provided on an opposite side of the penetration part 44 from the hinge 46. Herein, a locking protrusion is formed as the locking part 54, and a locking concave part is formed as the locked part 52.

The locking protrusion as the locking part 54 includes a column part 55 provided to protrude outward from the outer surface of the extension piece 42 and a wing part 56 provided on a tip end of the column part 55. The wing part 56 extends from the tip end of the column part 55 toward a lateral side of the column part 55.

The locking concave part as the locked part 52 is formed into a through hole-like shape. When the locking protrusion passes through the locking concave part, at least one of the locking protrusion and a peripheral part of the locking concave part is elastically deformed and can pass through the locking concave part. After the locking protrusion passes through the locking concave part, the elastically-deformed part is elastically restored, and the locking protrusion is caught on the peripheral part of the locking concave part and thereby locked. A guide surface guiding the locking protrusion to the locking concave part is formed on at least one of the tip end of the locking protrusion and the peripheral part of the locking concave part. Herein, a guide surface guiding the locking protrusion to the locking concave part is formed on both the tip end of the locking protrusion and the peripheral part of the locking concave part.

The wiring member 10 is sandwiched and held between the extension piece 42 and the retaining part 48 in the support member 30. Herein, the fixing piece 24 of the sheet material 20 is sandwiched and held between the extension piece 42 and the retaining part 48 in the support member 30.

The second catching part 60 is provided on a side opposite to the first catching part 40 along the circumferential direction of the support member 30. Herein, the plurality of second catching parts 60 are provided. The plurality of second catching parts 60 are provided at intervals along the longitudinal direction of the support member 30. The second catching part 60 attaches the connector C of the wiring member 10. More specifically, the second catching part 60 attaches the cassette part Hc of the connector C. The second catching part 60 includes a catching piece 62. A catching concave part 63 and a catching hole 64 are formed in the catching piece 62.

The catching piece 62 is provided to extend from an end portion in the circumferential direction of the mounting body part 36 on a side opposite to an end portion in the circumferential direction from which the extension piece 42 of the first catching part 40 extends. The catching piece 62 extends in a tangential direction from the end portion of the mounting body part 36 in the circumferential direction in a position of the end portion of the mounting body part 36 in the longitudinal direction. The catching piece 62 and the extension piece 42 are parallel to each other, for example. The catching piece 62 faces the retaining part 48 in the open state. The catching piece 62 can be inserted into the cassette part Hc of the connector C.

The catching concave part 63 is provided on a tip end of the catching piece 62. The catching concave part 63 is formed so that a tip end edge portion of the catching piece 62 is concave on a base end portion side. The catching hole 64 is provided in a position closer to the base end portion side of the catching piece 62 in relation to the locking concave part 63. The catching hole 64 is the through hole 51 formed to pass through the catching piece 62. A locking piece provided in the cassette part Hc of the connector C is locked to the catching hole 64 in a state where the catching piece 62 is inserted into the cassette part Hc of the connector C, thus the connector is attached to the second catching part 60.

Attaching Method

Figure 6:
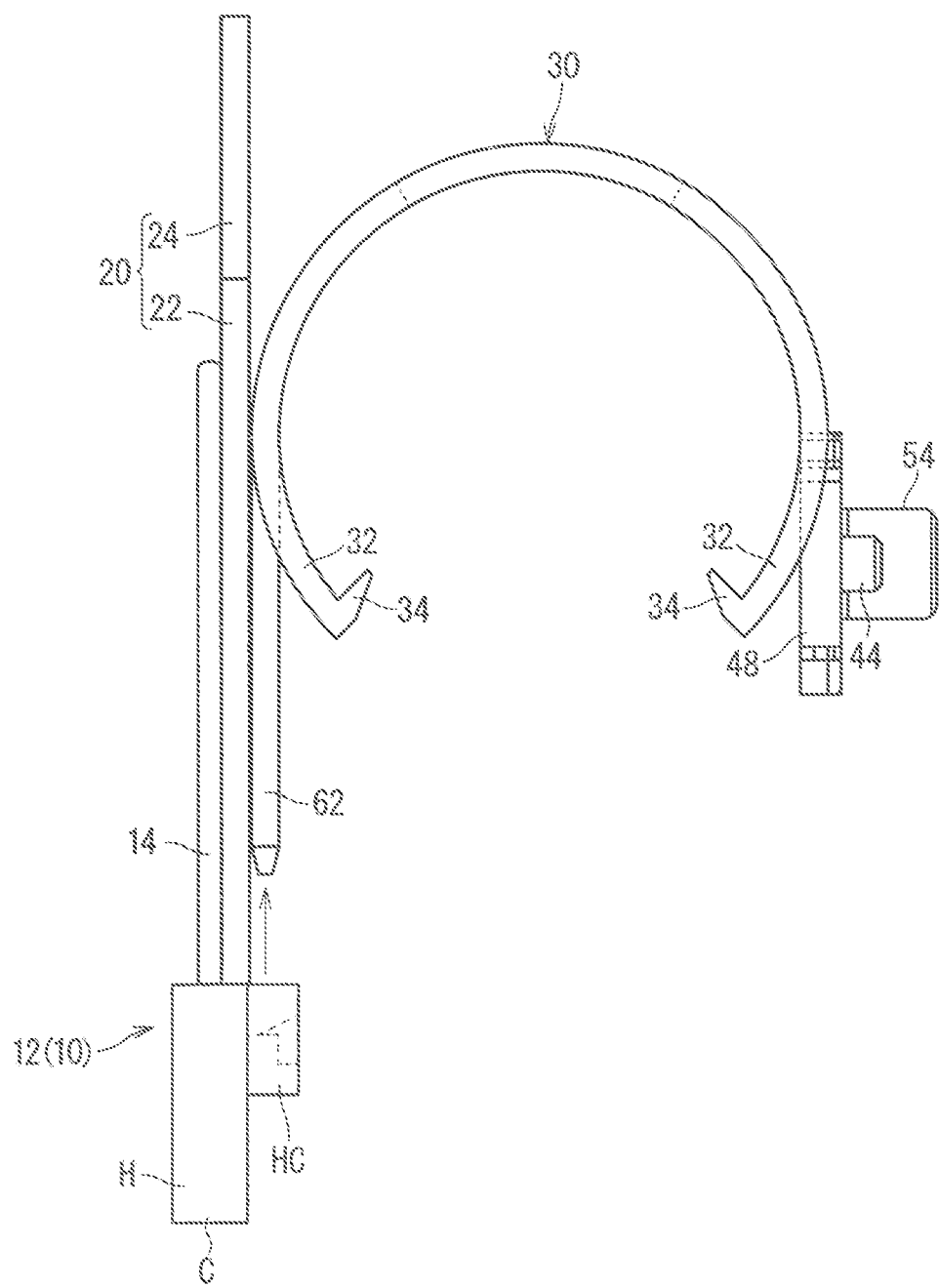
FIG. 6 is an explanation diagram illustrating a wiring member attached to a support member.
Figure 7:
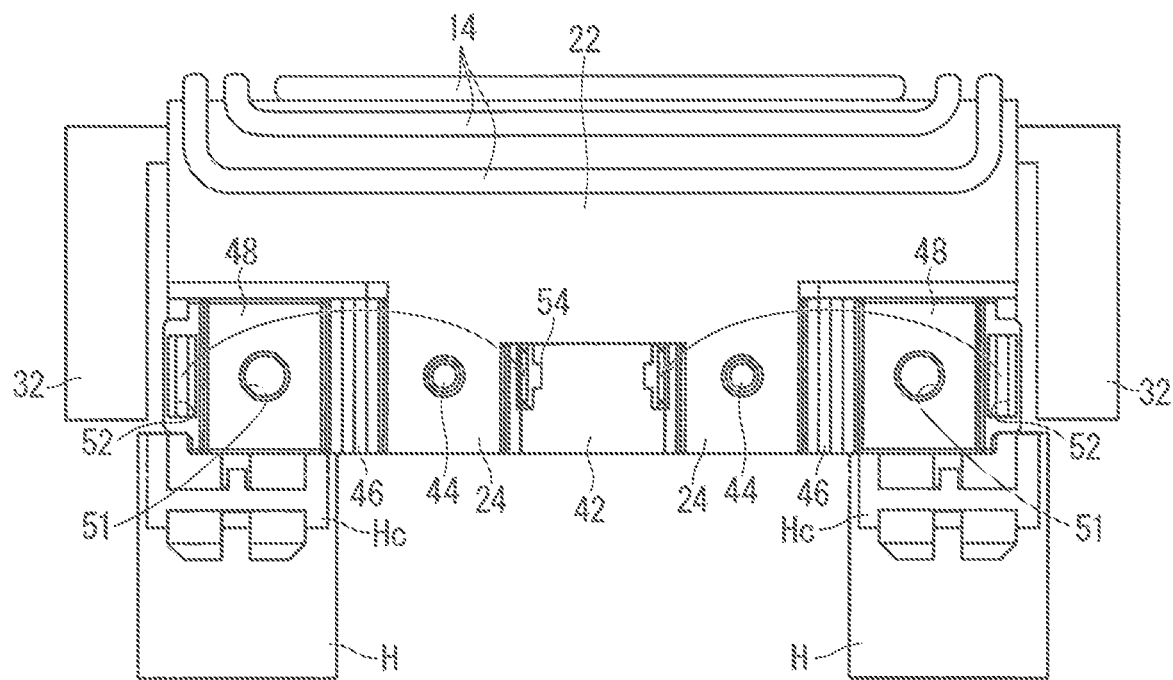
FIG. 7 is an explanation diagram illustrating a wiring member attached to a support member.

A method of attaching the wiring member 10 to the support member 30 is described with reference to FIG. 6 and FIG. 7. FIG. 6 and FIG. 7 are explanation diagrams each illustrating the wiring member 10 attached to the support member 30.

Firstly, the cassette part Hc of the connector C is attached to the second catching part 60 of the support member 30 as illustrated in FIG. 6. In this state, the sheet material-attached wire body 12 is wound around the support member 30 along an outer peripheral part of the mounting body part 36. Subsequently, the penetration part 44 passes through the insertion hole 26 formed in the fixing piece 24 of the sheet material 20. Accordingly, a state illustrated in FIG. 7 is achieved.

Subsequently, as indicated by an arrow in FIG. 7, the retaining part 48 of the first catching part 40 is rotated so as to be changed from the open state to the close state, and the locking protrusion as the locking part 54 is inserted into and locked to the locking concave part as the locked part 52.

As described above, the wiring member 10 is supported by the support member 30, and the support member-attached wiring member 1 is completed. It is considered that the process of attaching the wiring member 10 to the support member 30 is performed in a plant different from an assembly plant in which the support member-attached wiring member 1 is assembled to a vehicle, and the support member-attached wiring member 1 is transported to the assembly plant. Accordingly, in the assembly plant, the wiring member 10 can be assembled to the rod-like member 100 by a simple operation of fitting the support member 30 in the support member-attached wiring member 1 to the rod-like member 100.

According to the support member-attached wiring member 1 having the above configuration, the retaining part 48 prevents the penetration part 44 from coming out of the wiring member 10, thus the wiring member 10 is supported by the support member 30. At this time, the penetration part 44 passes through the wiring member 10, thus the wiring member 10 can be positioned in the support member 30. The support member 30 supporting the wiring member 10 is supported by the rod-like member 100, thus the rod-like member 100 can support the flat wiring member 10.

The penetration part 44 is molded integrally with the support member 30, thus the penetration part 44 hardly comes out to the outer peripheral side of the wiring member 10 compared with a case where the penetration part 44 is formed separately from the support member 30. More specifically, when the penetration part 44 is to come out to the outer peripheral side of the wiring member 10, the extension piece of the support member 30 interferes with the wiring member 10, thus the penetration part 44 hardly comes out thereto.

The retaining part 48 is molded integrally with the support member 30 so as to be rotatable via the hinge 46, thus the number of components can be reduced compared with a case where the retaining part 48 is formed separately from the support member 30.

The support member 30 further includes the locking part 54 locked to the locked part 52 of the retaining part 48, thus the retaining part 48 can be locked. At this time, the locking part 54 is provided separately from the penetration part 44, thus a stable locking state can be easily obtained.

The wiring member 10 includes the plurality of electrical wires 14 and the sheet material 20 keeping the plurality of electrical wires 14 in the flat state and allowing the penetration part 44 to pass through the sheet material 20, thus the flat wiring member 10 can be formed using the generalized electrical wire 14.

The wiring member 10 is sandwiched and held between the support member 30 and the retaining part 48, thus the wiring member 10 is hard to get loose state.

Modification Example

In the description of the embodiment, the support member 30, the penetration part 44, and the retaining part 48 are integrally molded, however, this configuration is not necessary. For example, it is also considered that the penetration part 44 and the retaining part 48 are integrally molded, and the support member 30 is molded separately from them. This example is described with reference to FIG. 8 and FIG. 9.

Figure 8:
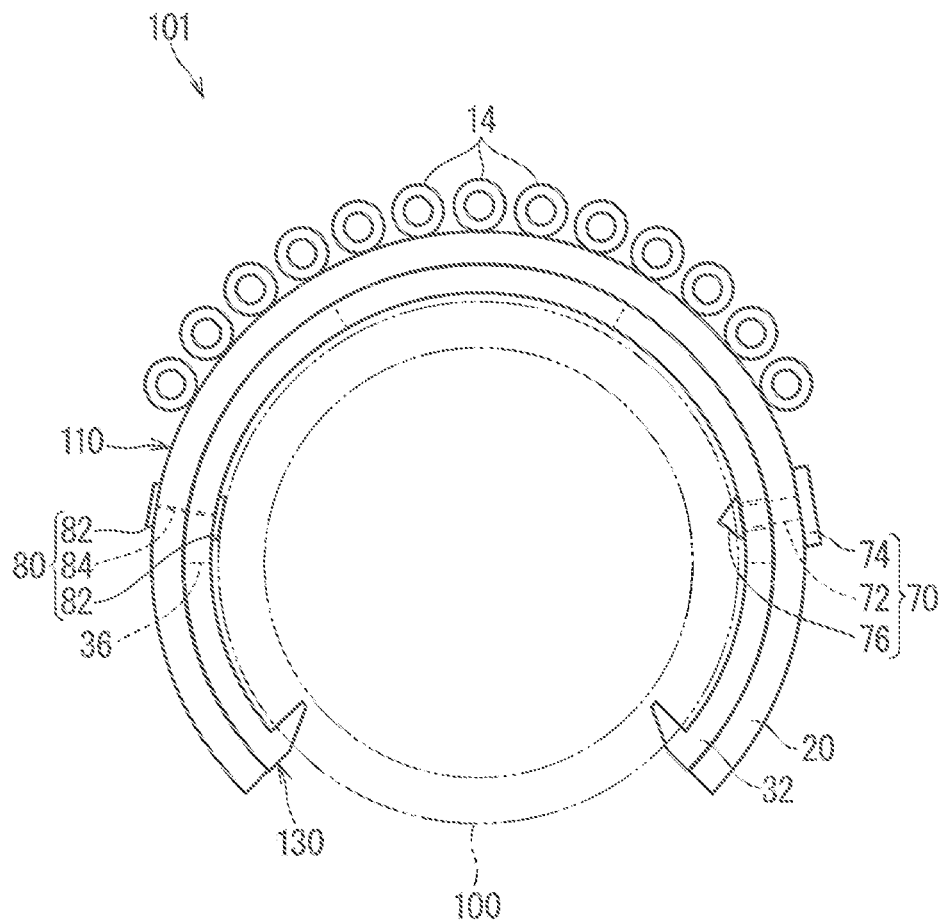
FIG. 8 is a front view illustrating a support member-attached wiring member according to a First modification example.

FIG. 8 is a front view illustrating a support member-attached wiring member 101 according to a first modification example.

Described herein is an example that a component in which the penetration part and the retaining part are integrally molded is a pin member. A first pin member 70 and a second pin member 80 are provided as the pin members.

The first pin member 70 includes a shaft part 72 as a penetration part, a support plate 74 as a retaining part, and a locking wing part 76. The support plate 74 is provided on one end of the shaft part 72, and the locking wing part 76 is provided on the other end. The locking wing part 76 is formed to be gradually separated from the shaft part 72 with a decreasing distance from a side of the support plate 74. The locking wing part 76 can be elastically deformed so that the tip end thereof gets close to the shaft part 72.

The support member 130 is formed into a shape in which the catching parts 40 and 60 are excluded from the support member 30. At this time, it is sufficient that an insertion hole into which the shaft part 72 is inserted is formed in the support member 130 and the wiring member 110. For example, an insertion hole is formed in the mounting body part 36 in the support member 130. The locking wing part 76 is elastically deformed, there by being able to pass through the insertion hole. In the meanwhile, the support plate 74 is formed into a flat plate-like shape larger than the locking wing part 76 and through which an insertion hole cannot pass.

The first pin member 70 is inserted into the insertion hole from a side of the wiring member 110. That is to say, the locking wing part 76 is firstly inserted into the insertion hole of the wiring member 110 toward a side of the support member 130 with elastic deformation. The shaft part 72 is also inserted into the insertion hole subsequent to the locking wing part 76. Then, the locking wing part 76 passes through the insertion hole formed in the support member 130 and is elastically restored, and is locked to a periphery of the insertion hole, thus the first pin member 70 attaches the wiring member 110 to the support member 130.

The second pin member 80 is formed into a shape in which a pair of locking pieces 82 are connected by a rod-like connection part 84. The second pin member 80 is formed into a so-called tag pin-like shape. The rod-like connection part 84 of the second pin member 80 constitutes a penetration part. A part of the second pin member 80 constituting a retaining part changes in accordance with a way of attachment.

More specifically, in the example illustrated in FIG. 8, one of the locking pieces 82 is located on an outer side of the wiring member 110 and the other one of the locking pieces 82 is located on an outer side of the support member 130 in a state where the rod-like connection part 84 passes through the wiring member 110 and the support member 130. In this case, the locking piece 82 located on the outer side of the wiring member 110 is the retaining part.

For example, the second pin member 80 can be driven by a so-called tag gun. At this time, when only one of the locking pieces 82 is driven, a state illustrated in FIG. 8 is achieved.

In contrast, there may also be a case where both the pair of locking pieces 82 are driven. In this case, both the pair of locking pieces 82 are located on the outer side of the support member 130. Parts of the rod-like connection part 84 connected to the pair of locking pieces 82 pass through the support member 130 and the wiring member 110 in separated positions, and a part therebetween is located on the outer side of the wiring member 110. Accordingly, in this case, the rod-like connection part 84 includes a part constituting the penetration part and a part constituting a retaining part.

When the second pin member 80 is driven by a tag gun, there may be a case where an insertion hole into which a needle of the tag gun can be inserted is made in advance or there may also be case where the insertion hole is not made.

Figure 9:
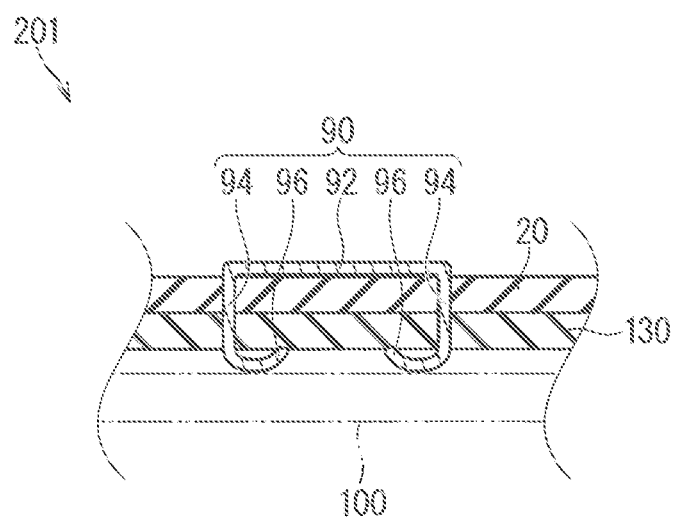
FIG. 9 is a front view illustrating a support member-attached wiring member according to a second modification example.

FIG. 9 is a front view illustrating a support member-attached wiring member 201 according to a second modification example.

Described herein is an example that a component in which the penetration part and the retaining part are integrally molded is a staple 90. The staple 90 can be driven in positions where the pin members 70 and 80 are provided in the support member 130, for example. The staple 90 is formed by bending one thin rod-like part into a shape including the retaining part 92, the penetration part 94, and the locking part 96. More specifically, a middle portion of one thin rod-like part is the retaining part 92 attached to the outer side of the wiring member 110. Parts connected to both sides of the retaining part 92 are bent to be the penetration parts 94 passing through the wiring member 110 and the support member 130. Tip ends of the penetration parts 94 are bent to be the locking parts 96 locking the components at the outer side of the support member 130. The staple 90 can be driven by a so-called stapler, for example. At this time, an insertion hole through which the staple 90 passes may be or may not be formed in the support member 130 in advance.

When the pin members 70 and 80 and the staple 90 are provided in the support member 130, it is preferable that the pin members 70 and 80 and the staple 90 are not in direct contact with the rod-like member 100. For example, when the pin members 70 and 80 and the staple 90 are provided on the part of the support member 130 following the rod-like member 100 such as the mounting body part 36, it is sufficient that a surface of this part of the support member 130 on a side of the rod-like member 100 or an outer surface of the rod-like member 100 facing this part is concaved. It is also applicable that a part, such as the extension piece 42 described above, separated from the rod-like member 100 is provided on the support member 130 and the pin members 70 and 80 and the staple 90 are provided on this part, for example.

Besides the above configuration, there may also be a case where the support member and the penetration part are integrally formed and the retaining part is molded separately from them, for example. Considered as an example of this case is that the retaining part 48 is separated from the support member 30 in a part of the hinge 46 in the support member 30 described above, for example. Considered in this case, for example, is that one more set of the locking part 54 and the locked part 52 is provided on the retaining part 48 and the support member 30 in place of the hinge 46. Considered in this case, for example, is that two retaining parts 48 are connected to be one member. In this case, it is sufficient that the penetration part 44 is provided between the two locking parts 54.

For example, there may also be a case where the support member and the retaining part are integrally molded, and the penetration part is molded separately from them. Considered as an example of this case is that in the support member 30 described above, the penetration hole 51 is formed in the position of the penetration part 44, the first pin member 70 described above as the penetration part passes through the support member 30 and the wiring member 10 from the side of the support member 30, and the locking wing part 76 thereof is inserted into and locked to the through hole 51 of the retaining part 48, for example.

For example, there may also be a case where the support member, the penetration part, and the retaining part are molded separately from each other. Considered as an example of this case is that the first pin member 70 is inserted in a direction opposite to the example illustrated in FIG. 8 in the support member 130, and the retaining part having a shape in which the through hole is formed in a flat plate on an outer side of the wiring member 110 is locked to the locking wing part 76 of the first pin member 70, for example.

In the example described above that the support member, the penetration part, and the retaining part are molded separately from each other, the locking wing part 76 of the first pin member 70 functions as the locking part 54. As in this case, it is also considered that the locking part 54 is integral with the penetration part. That is to say, in the above description, the locking part is provided separately from the penetration part, however, this configuration is not necessary. It is also considered that the locking part is integral with the penetration part. Besides the above example, also considered is a configuration that in the support member 30, the locking part 54 is provided on a tip end of the penetration part 44 and is locked to the penetration hole 51 of the retaining part 48.

In the above description, the locking protrusion is formed as the locking part 54, and the locking concave part is formed as the locked part 52, however, this configuration is not necessary. For example, it is applicable that a locking concave part is formed as the locking part 54, and a locking protrusion is formed as the locked part 52. For example, it is applicable that a locking protrusion is formed as the locking part 54 and the locked part 52.

In the above description, the wring member 10 is the sheet material-attached wire body 12, however, this configuration is not necessary. The wiring member 10 may be a so-called flexible flat cable (FFC) in which a plurality of core wires are collectively covered by one covering or a so-called flexible printed circuit (FPC) in which a circuit is formed in conductive foil attached to an insulating film as a base.

Also when the wiring member 10 is the sheet material-attached wire body 12, the configuration thereof is not limited to that described above. With regard to the shape of the wire-like transmission member 14, for example, an outer shape of the wire-like transmission member 14 may be formed into a quadrangular shape in cross section. In this case, an area of contact between the sheet material 20 and the wire-like transmission member 14 can be easily increased. With regard to a means of fixing the wire-like transmission member 14 and the sheet material 20, the wire-like transmission member 14 and the sheet material 20 may be joined by an adhesive agent or an adhesive tape, for example. The wire-like transmission member 14 may be sewn to the sheet material 20 by a sewing thread, for example. The sheet material-attached wire body 12 may include a cover covering the wire-like transmission member 14 from a side opposite to the sheet material 20 described above.

The transmission route in the wiring member 10 is completed in the region supported by the support member 30 described above, however, this configuration is not necessary. More specifically, both end portions of the electrical wire 14 are connected to the connector C supported by the support member 30, however, this configuration is not necessary. It is also considered that at least one end portion of the electrical wire 14 is connected to the connector C which is not supported by the support member 30. In this case, it is also considered that the sheet material 20 extends together with the electrical wire 14 or the electrical wire 14 extends to an outer side from the sheet material 20. In this case, the electrical wire 14 may extends along the rod-like member 100, or may also extends separately front the rod-like member 100.

In the above description, one wiring member 10 is supported by one support member 30, however, this configuration is not necessary. Also considered, for example, is that one wiring member 10 is supported by the plurality of support members 30. More specifically, when the plurality of support members 30 are attached at intervals along the longitudinal direction of the rod-like member 100, one wiring member 10 is considered to be supported over the plurality of support members 30, for example. Also considered, for example, is that at least some of the plurality of wiring members 10 are supported by one support member 30. More specifically, it is considered that one wiring member 10 is supported by the support member 30 using the first catching part 40 and the second catching part 60 on one end side of the support member 30 in the longitudinal direction, and the other wiring member 10 is supported by the support member 30 using the first catching part 40 and the second catching part 60 on the other end side of the support member 30 in the longitudinal direction.

In the above description, the support member 30 includes the mounting body part 36, however, this configuration is net necessary. For example, there may also be a case where the support member is made up of only the fitting part 32 or only the fitting part 32 and the protrusion 34. In this case, it is sufficient that the wiring member 10 is attached to the fitting part 32.

In the description in the embodiment, the retaining part 48 is maintained in the close state by locking the locking part 54 and the locked part 52, however, this configuration is not necessary. It is also considered, for example, that the retaining part 48 is joined to a part of the wiring member 10 or support member 30, and the retaining part 48 is maintained in the close state.

In the description in the embodiment, the wiring member 10 is sandwiched and held between the support member 30 and the retaining part 48, however, this configuration is not necessary. There may also be a case where the wiring member 10 is not sandwiched and held between the support member 30 and the retaining part 48.

Each configuration described in the embodiment and each modification example can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS

1 support member-attached wiring member
10 wiring member
12 sheet material-attached wire body
14 electrical wire (wire-like transmission member)
20 sheet material
22 arrangement body part
24 fixing piece
26 insertion hole
30 support member
32 fitting part
40 first catching part
42 extension piece
44 penetration part
46 hinge
48 retaining part
52 locked part
54 locking part
60 second catching part
70 first pin member
80 second pin member
90 staple
100 rod-like member
C connector
H housing

The invention claimed is:

1. A support member-attached wiring member, comprising:
　a wiring member configured to have a substantially semi-circular shape; and
　a support member including:
　　a fitting part formed into a cylindrical shape including an opening in one portion in a circumferential direction of the fitting part so as to be able to be fitted to an outer peripheral part of a rod-like member;
　　a penetration part passing through the wiring member in a state where the wiring member is disposed on an outer side of the support member; and
　　a retaining part which does not pass through the wiring member, the retaining part being provided on an outer side of the wiring member and covering the penetration part at the outside of the wiring member to prevent the penetration part from coming out of the wiring member, wherein the wiring member is bended along the circumferential direction of the fitting part, and the retaining part covers only an end portion of the wiring member in a circumferential direction of the wiring member bended along the circumferential direction of the fitting part.

2. The support member-attached wiring member according to claim 1, wherein the penetration part is molded integrally with the support member.

3. The support member-attached wiring member according to claim 1, wherein the retaining part is molded integrally with the support member so as to be rotatable via a hinge.

4. The support member-attached wiring member according to claim 1, wherein the support member further includes a locking part locked to a locked part of the retaining part.

5. The support member-attached wiring member according to claim 4, wherein the locking part is provided separately from the penetration part.

6. The support member-attached wiring member according to claim 1, wherein the wiring member includes a plurality of wire-like transmission members and a sheet material on which the plurality of wire-like transmission members are fixed, the sheet material allowing the penetration part to pass through the sheet material.

7. The support member-attached wiring member according to claim 1, wherein the wiring member is sandwiched and held between the support member and the retaining part.

* * * * *